United States Patent
Wojtyczka et al.

(10) Patent No.: US 6,652,222 B1
(45) Date of Patent: Nov. 25, 2003

(54) FAN CASE DESIGN WITH METAL FOAM BETWEEN KEVLAR

(75) Inventors: Czeslaw Wojtyczka, Brampton (CA); Samy Amin, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/200,460

(22) Filed: Sep. 3, 2002

(51) Int. Cl.$^7$ ................................. F01D 21/00
(52) U.S. Cl. ........................... 415/9; 415/200
(58) Field of Search ................. 415/9, 173.4, 197, 415/200

(56) References Cited

U.S. PATENT DOCUMENTS

| | | |
|---|---|---|
| 2,879,936 A | 3/1959 | Faught |
| 3,126,149 A | 3/1964 | Bowers, Jr. et al. |
| 4,149,824 A | 4/1979 | Adamson |
| 4,377,370 A | 3/1983 | Porcelli |
| 4,534,698 A | 8/1985 | Tomich |
| 4,878,821 A * | 11/1989 | Huether et al. ............ 415/9 |
| 5,160,248 A | 11/1992 | Clarke |
| 5,259,724 A | 11/1993 | Liston et al. |
| 5,344,280 A | 9/1994 | Langenbrunner et al. |
| 5,437,538 A | 8/1995 | Mitchell |
| 5,447,411 A | 9/1995 | Curley et al. |
| 5,482,429 A | 1/1996 | Penda |
| 5,516,257 A | 5/1996 | Kasprow et al. |
| 6,059,524 A | 5/2000 | Costa et al. |

* cited by examiner

Primary Examiner—Christopher Verdier

(57) ABSTRACT

A fan blade fragment containment assembly for a gas turbine engine having a fan case surrounding the fan and having a circumferential axially extending blade fragment impact zone. An inner relatively slack or low tension deformable layer of Kevlar™ or Zylon™ fabric is mounted to the fan case outer surface and envelopes the impact zone. A compressible (ex. metal foam or honeycomb) layer is mounted on an outer surface of the deformable layer. A friction reduction layer of Teflon™ is mounted on an outer surface of the compressible layer and an outer relatively taut higher tension containment layer of Kevlar™ or Zylon™ fabric is mounted on an outer surface of the friction reduction layer. The friction reduction layer enhances the distribution of impact forces about the circumference of the compressible layer by reducing local shear stresses between the compressible layer and the containment layer.

5 Claims, 3 Drawing Sheets

FAN CASE DESIGN WITH METAL FOAM BETWEEN KEVLAR

TECHNICAL FIELD

The invention relates to a fan lade fragment containment assembly for a gas turbine engine with a compressible metal foam layer between an inner deformable layer and an outer containment layer.

BACKGROUND OF THE ART

The fan of a gas turbine engine is mounted on a rotatable hub with an array of fan blades projecting radially from the hub with a fan casing encircling the blades. It is possible for a fan blade to separate from the hub or a portion of the fan blade forming a fragment which is potentially hazardous if not contained within the engine.

Blades may become detached through metal fatigue or more commonly through a foreign object ingestion into the engine such as birds or hail stones. Foreign objects and any broken-blade fragments are propelled tangentially and axially rearwardly. Foreign objects are usually discharged through the bypass duct of the engine, however heavy blade fragments must be retained within the fan casing structure itself using a softwall containment; design to embed the fragments.

For small diameter engines a hard walled metallic case may be sufficient to deflect blade fragments axially rearwardly. In larger diameter engines the blade fragments are preferably retained within compressible honeycomb structures on the interior of the case and are often contained with ballistic fabric that encircles the fan casing.

The demands of blade fragment containment are balanced by the demands for low weight and high strength. Earlier systems are now being replaced with designs and incorporate lightweight high strength ballistic fabrics such as Kevlar™ wrapped in multiple layers around a relatively thin deformable metal support case. In effect, the fan case metal structure serves as a deformable support to maintain the proper shape and the fabric wrapping serves as a ballistic containment layer that deflects radially outwardly capturing blade fragments. The metal case is punctured locally but retains its shape and structural integrity of the fan case after impact. The punctured metal case continues to support the ballistic containment fabric and maintains the clearance between the blade tips and fan case.

U.S. Pat. No. 6,059,524 to Costa et al. describes a penetration resistance fan casing wherein the ballistic fabric wrapped around the metal fan case during impact is released and permitted to deform by becoming detached from a forward edge of the metal fan case. An important feature of fabric containment systems is that the containment fabric's penetration resistance is enhanced by slackening of the fabric and distribution of the tensile forces throughout the structure that encircles the fan case. The ballistic fabric acts as a tensile medium for transferring the radial impact force from the local area of the blade fragment to the metal fan case. A slackening or releasing of the tension within the ballistic fabric enables distribution of the impact forces and improves the penetration resistance of the ballistic fabric as kinetic energy of the blade fragment is reduced.

It is an object of the present invention to provide an improved blade containment system that minimizes damage to the adjacent nacelle.

It is a further object of the invention to minimize the diameter of the nacelle required to accommodate the containment system.

It is a further object of the invention to reduce or impede fragmentation of the released blade during impact with the containment system.

It is a further object of the invention to minimize the weight of the blade containment system as a function of the kinetic energy absorbed.

Further objects of the invention will be apparent from review of the disclosure, drawings and description of the invention below.

DISCLOSURE OF THE INVENTION.

The invention provides a fan blade fragment containment assembly for a gas turbine engine having a fan case surrounding the fan and having a circumferential axially extending blade fragment impact zone. A relatively slack, low tension deformable layer of ballistic fabric such as Kevlar™ or Zylon™ for example is mounted to the fan case outer surface and envelopes the impact zone. A compressible (ex. metal foam or honeycomb) layer is mounted on an outer surface of the deformable layer. A friction reduction layer, of Teflon™ or composite graphite based fabric, is mounted on an outer surface of the compressible layer and a relatively-taut, higher tension containment layer of Kevlar™ or Zylon™ fabric is mounted on an outer surface of the friction reduction layer.

On impact the blade fragment pierces through the fan case, deformable-layer and compressible layer and is captured by the containment layer. The blade fragment loses kinetic energy and sharp edges are somewhat blunted as a result of passing through the metal fan case, deformable fabric layer and compressible metal foam layer.

The containment layer extends radially on impact and under tension the containments layer transfers the impact forces circumferentially crushing the compressible layer. The slack created by the crushing action reduces tensile stresses and improves the capacity of the containment layer to resist penetration. The friction reduction layer enhances the distribution of impact forces about the circumference of the compressible layer by reducing local shear stresses between the compressible layer and the containment layer.

The use of light weight metal foam and light weight Kevlar™ ballistic fabrics results in a minimization of the containment system weight: relative to the kinetic energy it is capable of absorbing. Permitting the blade fragment to penetrate to the fan case, a first inner deformable Kevlar™ or Zylon™ layer and the metal foam while being contained by the outer containment Kevlar™ or Zylon™ layer reduces the kinetic energy while preventing fragmentation of the released blade which would occur for example if a hard or less deformable containment system were utilized. Compression of the metal foam layer, results in a reduced deflection of the containment layer during containment of the blade fragment compared with prior art systems. The prior art relies on a greater degree of deflection of the outer containment layer. In contrast, the present invention includes compression or crushing of the metal foam compressible layer, which enables reduced deflection of the outer containment layer of ballistic fabric.

Further provision of a low friction, friction reducing or lubricating layer between the outer containment layer and the compressible or crushable layer of metal foam enhances the distribution of impact forces from the local area of blade contact to the entire fan case. Reduction of friction enables rapid deflection of the outer containment layer and crushing of the relatively large zone of the compressible layer thereby reducing local sheer stresses and transferring tension produced on impact, enhancing the crushing of the metal foam, redistribution of impact forces and avoids local stresses by distributing stresses more efficiently throughout the encircling fan case.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
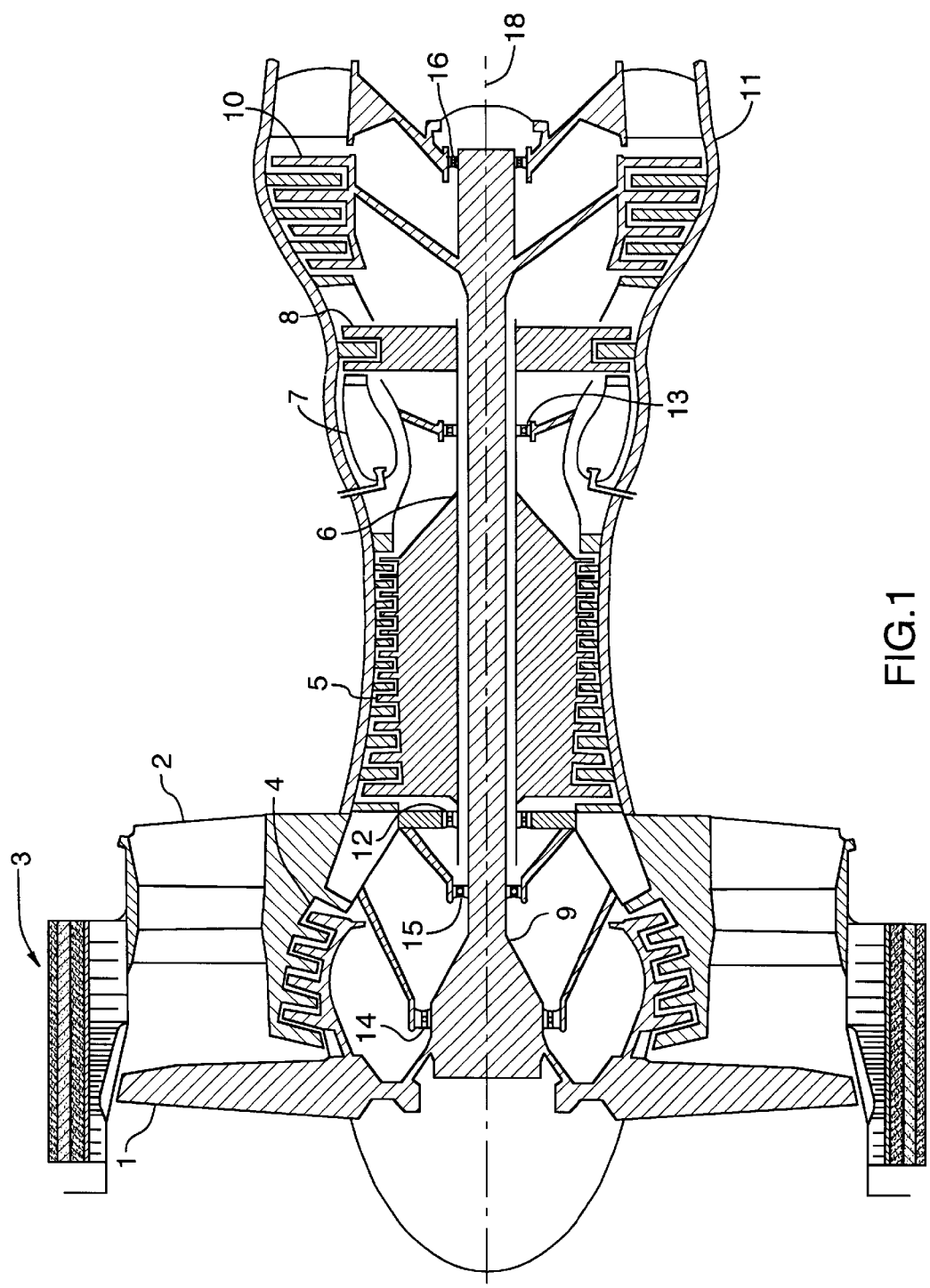
FIG. 1 is a longitudinal cross-sectional view through one example of a gas turbine engine showing coaxial low pressure and high pressure shafts, and showing the typical disposition of the fan and surrounding fan case assembly.

FIG. 1 shows a longitudinal cross-sectional view through an example gas turbine engine. Air passes through the engine (from left to right as drawn) first passing fan 1 and then splitting into two flows of air. An outer portion of the air flow passes through the bypass duct 2 formed by the annular fan case assembly 3 and an inner portion passes through the engine core past low pressure compressor blades 4. In the example-shown, the engine includes-an axial high pressure compressor 5 mounted to a high pressure shaft 6 and driven by hot gas passing from combustor 7 over high pressure turbine rotors 8. The fan 1 and low pressure compressor 4 are mounted to a low pressure shaft 9 driven by low pressure turbine rotors 10. Gas is exhausted through the exhaust mixer 11 after passing the rotors 10. As seen in FIG. 1, the high pressure shaft 6 is supported on forward bearings 12 and rearward bearings 13. In a like manner, the low pressure shaft 9 is supported on three bearings 14, 15 and 16.

Of particular interest to the present invention is the fan case 3 and applied layers of the fan blade fragment containment assembly thereon.

Figure 2:
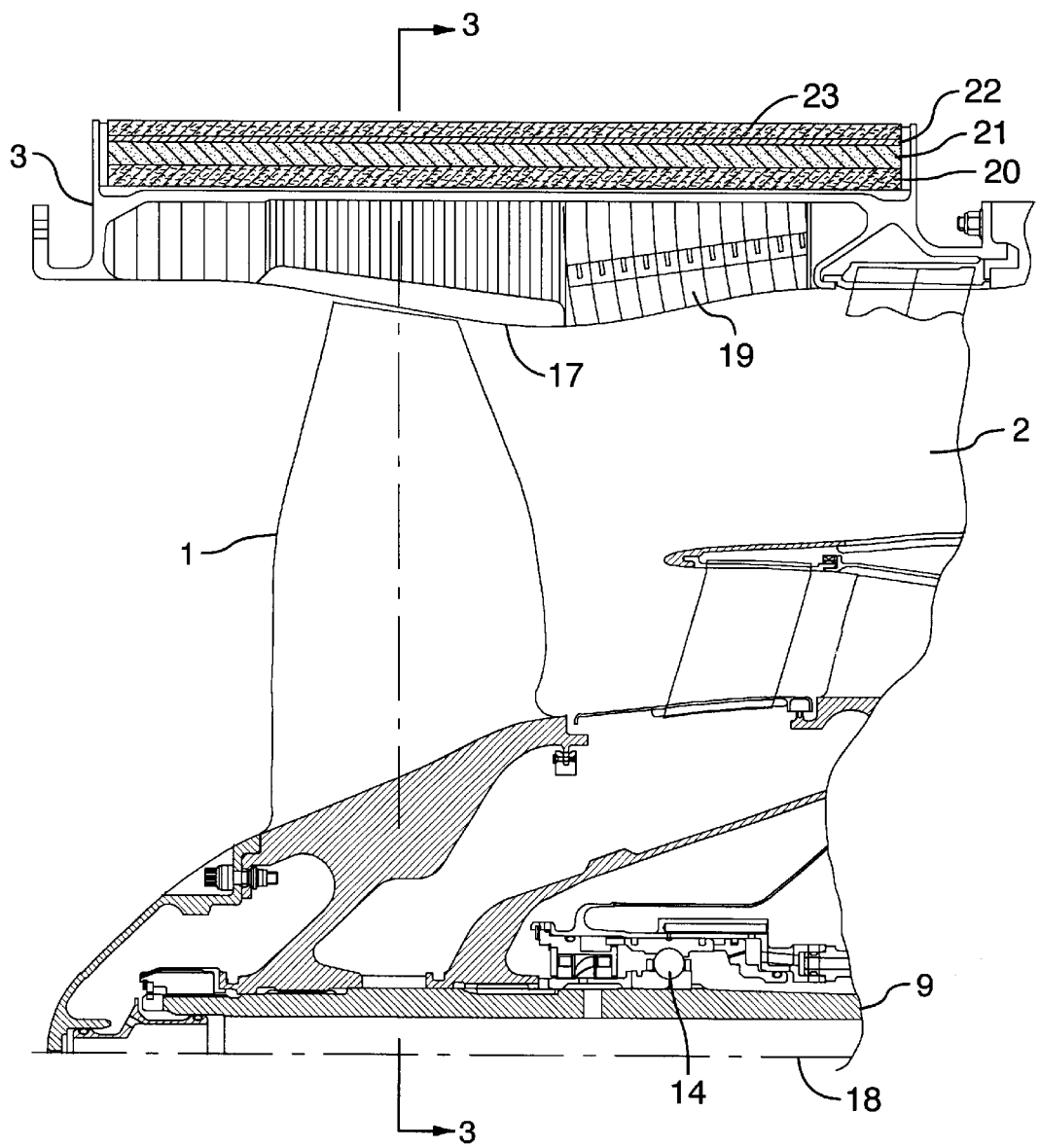
FIG. 2 is a detailed longitudinal cross-sectional view through the fan and fan case assembly.
Figure 3:
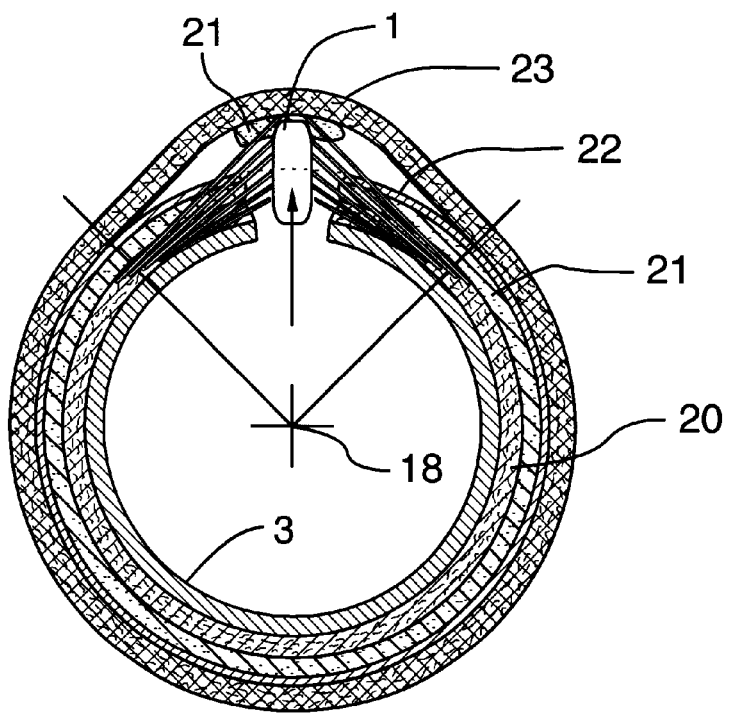
FIG. 3 is a radial cross-sectional view along lines 3—3 of FIG. 2 showing a blade fragment contained by the containment layer after penetrating the fan case, stretching the deformable layer, distorting the compressible layer and the friction reduction layer.
Figure 4:
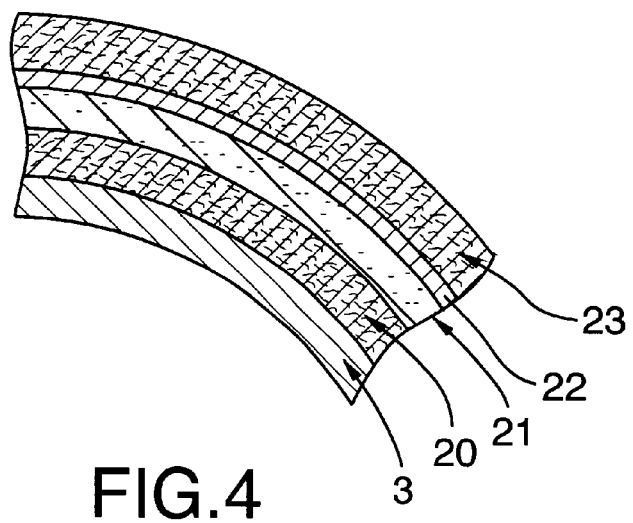
FIG. 4 is a detail radial sectional view through a segment of the layers of the fan blade containment case assembly before impact.

FIGS. 2, 3, and 4 show the details of the fan blade fragment containment assembly for t gas turbine engine. The metal fan case 3 has an inner surface surrounding the fan blades 1 mounted on a hub for rotation about the engine axis 18. An abradable layer 17 is provided to enable close tolerances to be maintained between the blade tips and the interior surface of the casing. Collapsible honeycomb structures 19 are also provided for retention of smaller blade fragments, acoustic dampening and to absorb the kinetic energy of the blade fragments as they pass through the casing 3.

Mounted to the outer surface of the fan case 3 and enveloping a circumferentially axially extending blade fragment impact zone are a series of layers as described below. Immediately mounted to the outer surface of the fan case 3 is a deformable layer 20. It is preferable to use a light weight high strength ballistic fabric such as an aromatic polyamide fibre fabric sold under the trade-mark of Kevlar™ or phenylene-2, 6-benzobisoxazole (PBO) fibre fabric sold under the trade-mark Zylon™ for this purpose due to their high strength to weight ratio. The metal case 3 provides a substrate for applying the deformable fabric layer 20. The building up of various layers on the metal fan casing 3 serves to significantly reinforce the structure during normal, operation. Puncture of the fan case 3 and deformable layer 20 as well as compressible layer 21 and friction reduction layer 22 is in the local area of the blade fragment impact. Preferably, the only layer completely penetrated is the metal fan case 3. The deformable fabric layer 20 has enough internal slackness to crush the compressible layer 21 locally and distribute impact loads widely through tension in the layer 20 exerting pressure radially inwardly to compress the compressible layer 21. It will be understood that the significant portion of the reinforced fan case 3 remains intact. The fan case 3 retains the internal shape of the fan case assembly for continued operation of the rotating fan 1 and providing support for the ballistic fabric layers 20 and 23.

The light weight axially compressible layer 21 is then mounted on the outer surface of the deformable layer 20. The compressible layer 21 is also a light weight material and provides a porous crushable layer that reinforces the fan case 3 in normal operation, but enables crushing during impact when deflection of the containment layer 23 redistributes tensile forces and crushes the compressible layer 21. The compressible or crushable layer can comprise an aluminium expanded metal foam, a honeycomb sheet metal structure, an expanded metal sheet, sintered metal particles or spray applied metal particles depending on the application. In all cases however the material should be light weight and readily compressible in order to permit deflection of the containment layer 23.

A friction reduction layer 22 is then mounted on the compressible layer 21 and serves to reduce friction thereby enabling deflection of the outer containment layer 23 relative to the compressible layer 21. Deflection of the containment layer .23 serves to absorb the kinetic energy of the fan blade fragment 1 and redistribute forces from the local area of impact to the remainder of the fan casing. Reduction of friction between the containment layer 23 and the compressible layer 21 combined with crushing or compressing of the compressible layer 21 permits redistribution of the impact forces readily and reduces the level of tensile strength required of the containment layer 23.

The containment layer 23 is mounted on the outer surface of the friction reduction layer 22 and may also be constructed of aromatic polyamide fibre fabric such as Kevlar™ which has a relatively light weight and high strength. Further the precise selection of warp and weft strands in the fabrics and their orientation can tailor the ballistic fabric to specific engine requirements. The friction reduction layer 22 may comprise a plastic sheet such as Teflon™ or other low friction materials, which permit deflection without transferring significant shear stresses between layers.

Although the above description relates to a specific preferred embodiment as presently contemplated by the inventor, it will be understood that the invention in its broad aspect includes mechanical and functional equivalents of the elements described herein.

We claim:

1. A fan blade fragment containment assembly for a gas turbine engine, comprising:

a fan case having an inner surface, surrounding a fan mounted for rotation about an engine axis, and an outer surface, the fan case having a circumferential axially extending blade fragment impact zone;

a deformable layer mounted to the fan case outer surface and enveloping the impact zone;

a compressible layer mounted on an outer surface of the deformable layer;

a friction reduction layer mounted on an outer surface of the compressible layer; and a containment layer mounted on an outer surface of the friction reduction layer.

2. A fan blade fragment containment assembly according to claim 1 wherein, the deformable layer is a fabric of fibres selected from the group consisting of: an aromatic polyamide fibre; and a phenylene-2, 6-benzobisoxazole fibre.

3. A fan blade fragment containment assembly according to crushable layer selected from the group consisting of: a metal foam; a honeycomb structure; an expanded metal sheet; sintered metal particles; and spray applied metal particles.

4. A fan blade fragment containment assembly according to claim 1 wherein the friction reduction layer is selected from the group consisting of: a plastic sheet; and a composite graphite based fabric.

5. A fan blade fragment containment assembly according to claim 1 wherein the containment layer is a fabric of fibres selected from the group consisting of: an aromatic polyamide fibre; and a phenylene-2, 6-benzobisoxazole fibre.

* * * * *

UNITED STATES PATENT AND TRADEMARK OFFICE
CERTIFICATE OF CORRECTION

PATENT NO.    : 6,652,222 B1
DATED         : November 25, 2003
INVENTOR(S)   : Czeslaw Wojtyczka and Samy Amin It is certified that error appears in the above-identified patent and that said Letters Patent is hereby corrected as shown below:

Column 6,
Line 2, between "to" and "crushable", insert -- claim 1 wherein the compressible layer comprises a porous --

Signed and Sealed this

Twenty-seventh Day of April, 2004

JON W. DUDAS
*Acting Director of the United States Patent and Trademark Office*